United States Patent [19]

Butler et al.

[11] E Re. 30,617

[45] Reissued May 19, 1981

[54] POWER ACTUATED TOOL

[75] Inventors: David F. Butler, Hamden; Elmer R. Hodil, New Haven, both of Conn.

[73] Assignee: Olin Mathieson Chemical Corporation, New Haven, Conn.

[21] Appl. No.: 65,682

[22] Filed: Aug. 10, 1979

Related U.S. Patent Documents

Reissue of:

[64] Patent No.: 3,341,101
Issued: Sep. 12, 1967
Appl. No.: 484,592
Filed: Sep. 2, 1965

[51] Int. Cl.[3] ..... B25C 1/14
[52] U.S. Cl. ..... 227/8; 227/10
[58] Field of Search ..... 227/8–11; 60/632–638

[56] References Cited

U.S. PATENT DOCUMENTS

| | | | |
|---|---|---|---|
| 2,705,323 | 4/1955 | Bossong | 227/11 |
| 2,910,701 | 11/1959 | Temple et al. | 227/8 |
| 2,918,674 | 12/1959 | Skumawitz | 227/8 |
| 2,970,314 | 2/1961 | Temple et al. | 227/8 |
| 2,977,598 | 4/1961 | Broughton | 227/8 |
| 2,995,753 | 8/1961 | Henning | 227/9 |
| 3,032,768 | 5/1962 | Lamoureux | 227/8 |
| 3,066,302 | 12/1962 | De Caro et al. | 227/10 |
| 3,172,119 | 3/1965 | Siddons | 227/8 |
| 3,235,154 | 2/1966 | Mulno | 227/10 |
| 3,348,751 | 10/1967 | Henning | 227/8 |

FOREIGN PATENT DOCUMENTS

| | | | |
|---|---|---|---|
| 1134640 | 8/1962 | Fed. Rep. of Germany | 227/9 |

*Primary Examiner*—Paul A. Bell
*Attorney, Agent, or Firm*—William W. Jones; Paul J. Lerner

[57] ABSTRACT

*An improved power-actuated tool having means for preventing firing if the tool is not properly aligned with the work surface. The tool housing member includes a slidably mounted firing mechanism having cocking means extending forwardly into engagement with a sensing means mounted in the barrel member for relative axial movement therewith. A first member is attached to the barrel member. A second member is mounted within the first member for relative axial movement therewith and with respect to the barrel member, and includes a portion adapted to engage the sensing means. The second member must be moved rearwardly with respect to the first member whereby the sensing means is moved rearwardly with respect to the barrel member and engages the cocking means to move the firing mechanism into the cocked position. The tool may also include an extractor mechanism mounted on the breech end of the barrel and provided with a lip portion adapted to engage the head of a cartridge positioned in the cartridge chamber. The extractor mechanism also includes an elongated portion slidably mounted in the barrel member and extending into a barrel guide slot. The end of the elongated portion is adapted to be engaged by a barrel guide screw secured to the housing upon movement of the barrel member from the breech closed to breech open position. The movement of the barrel member relative to the housing serves to move the extractor mechanism rearwardly with respect to the cartridge chamber thereby withdrawing the cartridge from the cartridge chamber.*

10 Claims, 9 Drawing Figures

POWER ACTUATED TOOL

Matter enclosed in heavy brackets [ ] appears in the original patent but forms no part of this reissue specification; matter printed in italics indicates the additions made by reissue.

This invention relates to tools for driving various members such as hammers, punches, cutters, or fasteners such as studs, pins, and the like into wood, steel, masonry or concrete, and more particularly, relates to such tools actuated by power means such as an explosive cartridge.

One of the objects of this invention is to provide an improved tool for driving fasteners or other members into a suitable surface.

A more specific object of this invention is to provide an improved tool having means for preventing firing of the tool unless the tool is properly positioned against a suitable surface.

A further object of this invention is to provide an improved tool having means to prevent firing of the tool if the tool is not properly aligned with the work surface.

Yet another object of the invention is to provide a tool having an improved mechanism for ejecting a spent cartridge.

These and other objects of the invention may be achieved through the provision of a tool having a barrel member slidably disposed for axial movement within a housing member. The housing member may include a slidably mounted firing mechanism having cocking means extending forwardly into engagement with a sensing means mounted in the barrel member for relative axial movement therewith. A first member is attached to the barrel member. A second member is mounted within the first member for relative axial movement therewith and with respect to the barrel member, and includes a portion adapted to engage the sensing means.

The arrangement of the elements is such that for the tool to be fired, the second member must be moved rearwardly with respect to the first member whereby the sensing means is moved rearwardly with respect to the barrel member and engages the cocking means to move the firing mechanism into the cocked position.

The tool may also include an extractor mechanism mounted on the breech end of the barrel and provided with a lip portion adapted to engage the head of a cartridge positioned in the cartridge chamber. The extractor mechanism also includes an elongated portion slidably mounted in the barrel member and extending into a barrel guide slot. The end of the elongated portion is adapted to be engaged by a barrel guide screw secured to the housing upon movement of the barrel member from the breech closed to breech open position. The movement of the barrel member relative to the housing serves to move the extractor mechanism rearwardly with respect to the cartridge chamber thereby withdrawing the cartridge from the cartridge chamber.

This invention may be more readily understood by reference to the following description of a preferred embodiment of the tool and the accompanying drawings in which.

Figure 1:
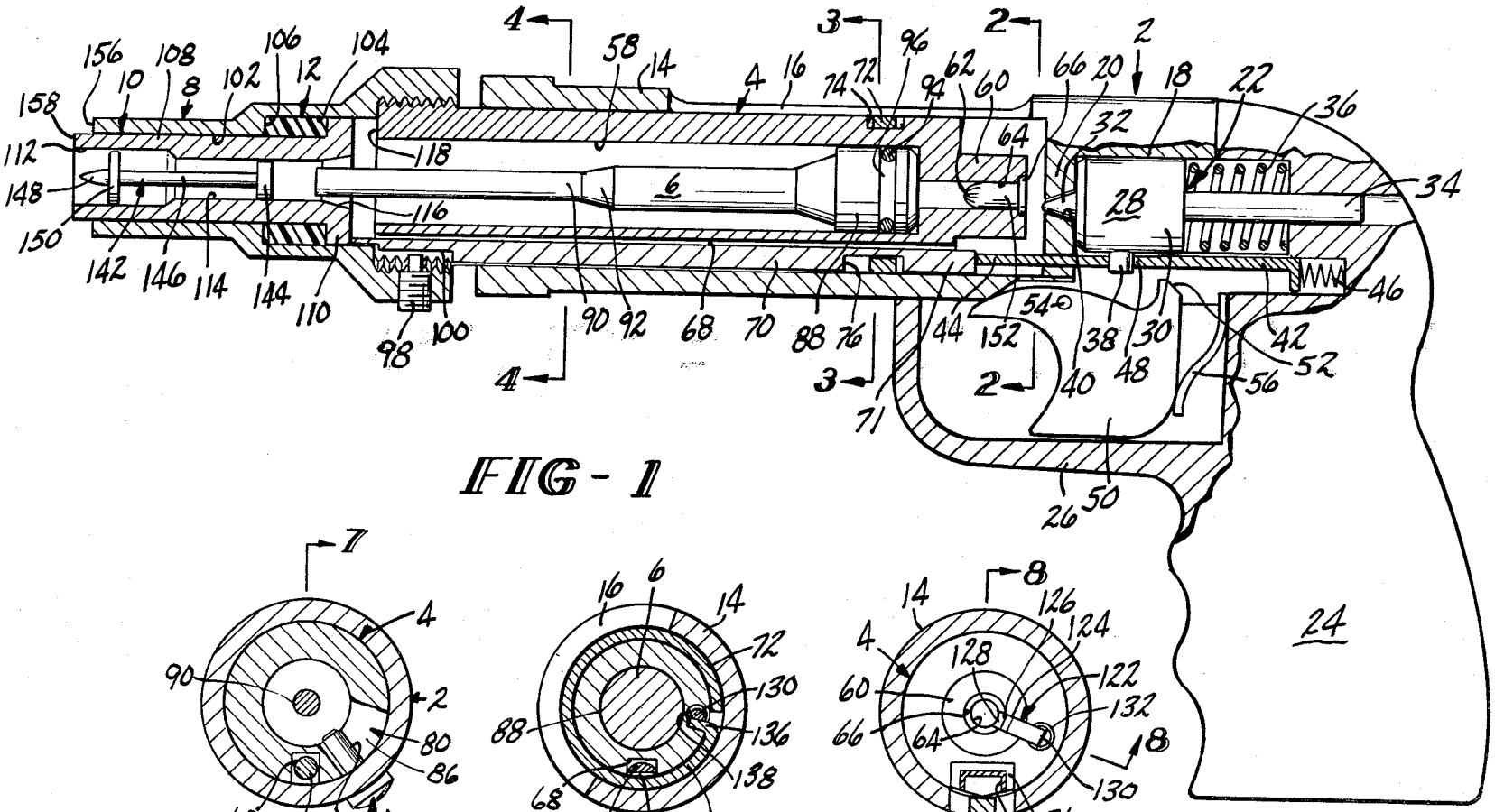
FIG. 1 is a longitudinal sectional view of a tool constructed in accordance with the present invention.

Referring specifically to the drawings, the tool comprises generally a housing 2 having a barrel member 4 disposed therein. A piston member 6 is mounted within the barrel member 4 for relative axial movement therewith. A buffer housing member 8 is attached to the forward end of the barrel member 4 and extends forwardly therefrom. A fastener guide 10 is mounted for sliding movement within the buffer housing member 8. Disposed between the buffer housing member 8 and the fastener guide 10 is a buffer member 12.

The housing 2 includes a tubular forward portion 14 having a breech opening 16 therein and a rear portion 18 separated from the forward portion 14 by a breech closure portion 20. The rear portion 18 houses the firing mechanism 22, and includes a pistol grip 24, and a trigger guard 26.

The firing mechanism 22 includes a firing pin 28 slidably mounted within the rear portion 18 of the housing 2. As can be seen in FIG. 1, the firing pin 28 includes a cylindrical body portion 30, a conical nose portion 32 extending forwardly from the cylindrical body portion 30, and an elongated cylindrical rearwardly extending projection 34. The firing pin 28 is urged forwardly by a suitable spring member 36. A detent member 38 extends radially downwardly from the body portion 30 of the firing pin 28. This detent member 38 may be spring biased outwardly by a suitable spring means (not shown). The conical nose portion 32 of the firing pin 28 is adapted to extend through a frusto-conical opening 40 in the breech closure portion 20.

A cocking member 42 is mounted for axial movement in the rear portion 18 of the housing 2 and includes a forward portion 44 which extends through a slot in the breech closure portion 20 and into the tubular forward portion 14 of the housing 2. The cocking member 42 may be spring biased forwardly by a suitable spring member 46. The cocking member 42 also includes a slot 48 through which the detent 38 on the firing pin 28 may extend. A trigger member 50 having a sear portion 52 may be pivotally mounted on the housing 2 by a pivoted pin 54. The trigger member 50 is resiliently urged out of engagement with the firing pin 28 by a spring member 56.

The barrel member 4, which includes a bore 58, is mounted for movement within the tubular forward portion 14 of the housing 2. The breech end of the barrel member 4 includes a cylindrical projection 60 into which the cartridge receiving chamber 62 extends. The cartridge receiving chamber 62 includes an elongated bore 64 and an enlarged counterbore 66 adapted to receive the rim portion of a cartridge.

A groove 68 extends along the entire length of the outer surface of the barrel member 4. Mounted within the groove 68 is a rod-like sensing member 70 which is of a length such that it can extend from both ends of the barrel member 4. The sensing member 70 includes an enlarged head portion 71 at its breech end for engagement with the cocking member 42.

The sensing member 70 is held in proper relationship with the barrel member 4 by a circumferentially extending band spring 72 disposed in a recess 74 in the external surface of the barrel member 4. The sensing member 70 includes a reduced portion 76 which has a greater axial length than the width of the spring 72 whereby the sensing member 70 may have limited axial movement with respect to the barrel member 4.

Figure 4:
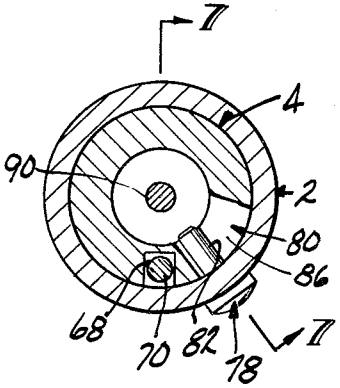
FIG. 4 is a transverse sectional view taken along the line 4—4 of FIG. 1.
Figure 7:
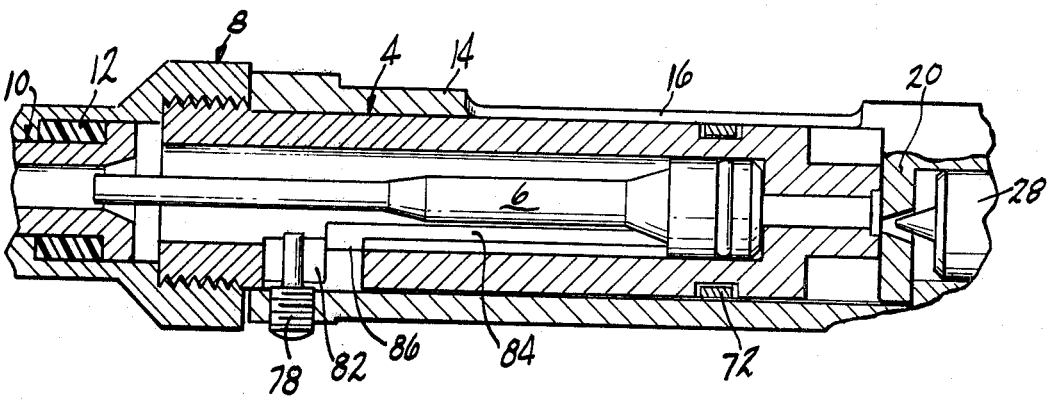
FIG. 7 is a longitudinal sectional view of a tool taken along the line 7—7 of FIG. 4 showing the relationship of the barrel guide screw and the barrel guide slots in the barrel member.

The barrel member 4 is guided during its movement with respect to the housing 2 by a barrel guide screw 78 which is secured to the housing 2 and extends into a Z-slot 80 in the barrel member 4. As seen particularly in FIGS. 4 and 7, the Z-slot 80 includes a first, relatively short, axially extending portion 82 adjacent the muzzle end of the barrel member 4, a circumferentially spaced, relatively long, axially extending portion 84 which extends to a point adjacent the breech end of the barrel member 4, and a circumferentially extending portion 86 interconnecting portions 82 and 84.

The piston member 6 is slidably mounted within the bore 58 of the barrel member 4. The piston member may include a cylindrical head portion 88 and a reduced elongated shank portion 90. The shank portion 90 has a tapered portion 92. A piston ring 94 may be mounted within a suitable groove 96 in the head portion 88.

The buffer housing member 8 is threadedly secured to the muzzle end of the barrel member 4. Relative rotation between the barrel member 4 and buffer housing member 8 may be prevented by a suitable screw member 98 which is attached to the buffer housing member 8 and extends into the barrel member 4. The sensing member 70 includes a reduced portion 100 in its forward end to provide clearance with the screw member 98.

The buffer housing member 8 includes a first cylindrical internal surface portion 102 and a second enlarged internal surface portion 104. The intersection of portions 102 and 104 provides a shoulder 106 in the internal surface.

The fastener guide 10 is slidably disposed within the buffer housing 8 and includes an external surface 108 having a sliding fit with the first internal surface 102 of the buffer housing member 8. An enlarged flange portion 110 having a diameter slightly less than the diameter of the enlarged internal surface portion 104 of the buffer housing 8 is provided adjacent the rearward end of the fastener guide 10. The internal surface of the fastener guide 10 includes a counterbore 112 adjacent the muzzle end thereof, a reduced cylindrical portion 114, and an inwardly tapering portion 116 adjacent the rearward end.

The buffer member 12 is disposed between the shoulder 106 and enlarged internal surface portion 104 of the buffer housing member 8 and the flange portion 110 and external surface 108 of the fastener guide 10. The buffer member may be a hollow cylinder of a suitable resilient material such as neoprene or urethane.

It will be noted that the axial length of the buffer member 12 is less than the length of the enlarged internal surface portion 104 of the buffer housing member 8 such that space is provided between the forward face 118 of the barrel member 4 and the buffer member 12 to permit limited axial movement of the fastener guide 10 relative to the buffer housing member 8. The forward end of the sensing member 70 may extend from the forward face 118 of the barrel member 4 into the area defined by the enlarged internal surface portion 104 of the buffer housing 8 in a position such that it may be engaged by the flange portion 110 of the fastener guide 10.

Figure 2:
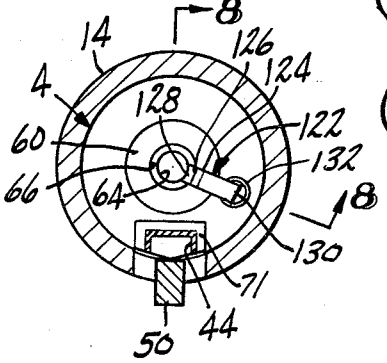
FIG. 2 is a transverse sectional view taken along the line 2—2 of FIG. 1.
Figure 8:
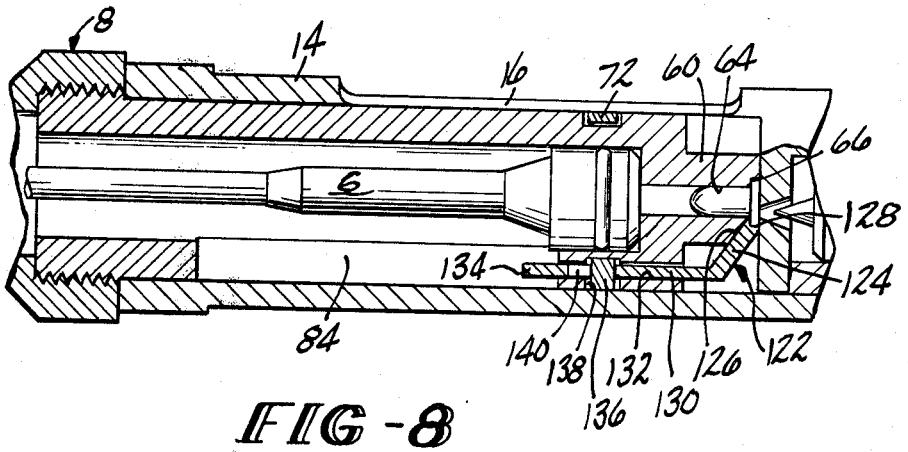
FIG. 8 is a longitudinal sectional view of a portion of the tool taken along the line 8—8 of FIG. 2 showing the extractor mechanism in its seated position.
Figure 9:
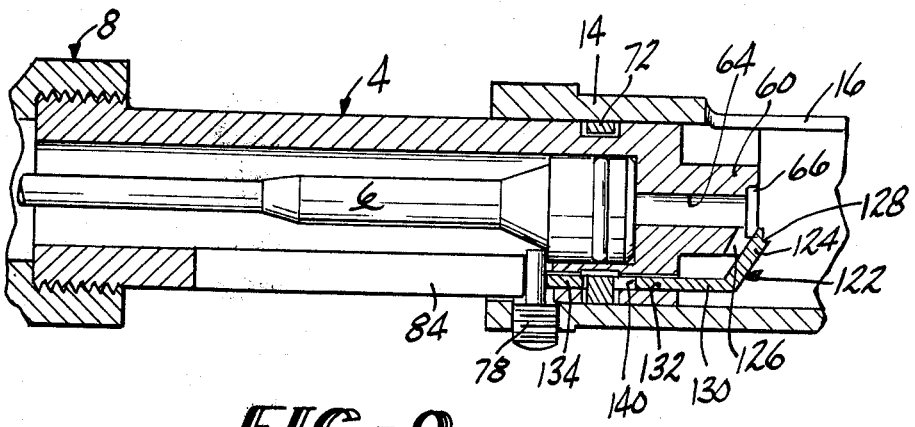
FIG. 9 is a partial longitudinal sectional view showing a portion of the tool in the breech open position and showing the extractor mechanism in a position after it has ejected a spent cartridge.

The extractor mechanism, indicated generally by 122 is shown in detail in FIGS. 2, 8, and 9. As can be seen, the extractor mechanism 122 includes a head portion 124 disposed in a slot 126 in the cylindrical projection 60. The slot 126 communicates with the cartridge receiving chamber 62 in the area of the counterbore 66. The head portion 124 of the extractor mechanism 122 includes a lip portion 128 having a shape corresponding to the counterbore 66 and adapted to engage the rim of a cartridge. An elongated rod portion 130 is attached to the head portion 124 and extends axially forwardly of the tool. The rod portion 130 is slidably mounted in a bore 132 which is coextensive with the relatively long portion 84 of the Z-slot 80 in the barrel member 4. When the head portion 124 of the extractor mechanism 122 is seated in the slot 126, the forward end 134 of the rod portion 130 extends into the relatively long portion 84 of the Z-slot 80 as best shown in FIG. 8.

Figure 3:
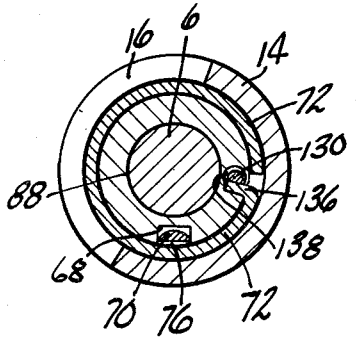
FIG. 3 is a transverse sectional view taken along the line 3—3 of FIG. 1.

The extractor mechanism 122 is limited in its axial movement by virtue of engagement with the spring member 72. As can be seen particularly in FIG. 3, the end portion 136 of spring member 72 extends radially inwardly into a suitable slot 138 in the barrel member 4. The rod portion 130 of the extractor mechanism 122 includes a recessed portion 140 for reception of the end portion 136 of the spring member 72. The axial length of the recessed portion 140 is larger than the width of the spring member 72 to permit relative axial movement of the extractor mechanism 122 with respect to the barrel member 4.

In operation, a fastener member 142 is positioned in the muzzle end of the fastener guide 10. The fastener member 142 may include an enlarged head portion 144 and a reduced shank portion 146. A plastic tip or washer or other member 148 may be attached to the forward end of the shank portion 146 and may include a circular flange 150 adapted to engage the walls of the counterbore 112 and center the fastener member 142 in the fastener guide 10.

Figure 5:
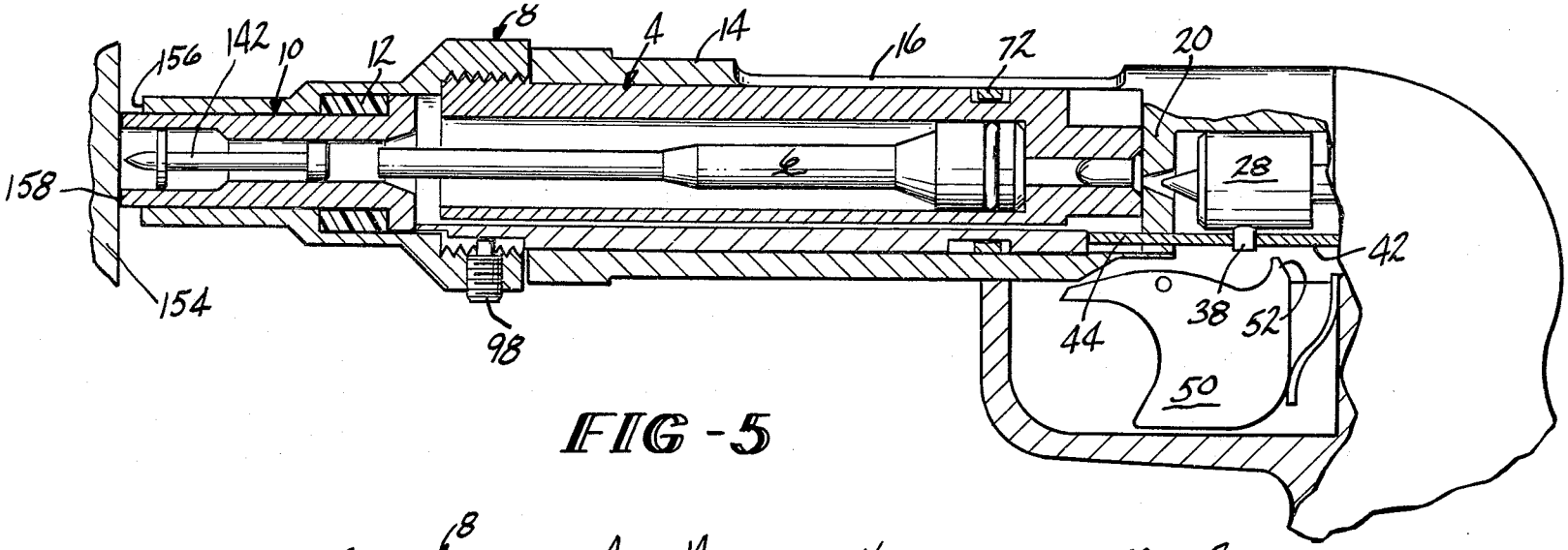
FIG. 5 is a longitudinal sectional view of the tool in one stage of its operation wherein the buffer housing has been moved rearwardly to the point where the barrel member abuts the receiver.

After a new cartridge 152 is inserted in the cartridge receiving chamber 62, the operator may grasp the buffer housing member 8 to move the buffer housing member 8, barrel member 4, and buffer member 12 toward the breech closure portion 20 of the housing 2 into the breech closed position of the tool as shown in FIG. 5. The operator may then place the muzzle end of the tool against a suitable surface 154 and push forwardly on the housing 2. In so doing, the fastener guide 10 is moved rearwardly with respect to the buffer housing member 8 to the point where the forward end faces 156 and 158 of the buffer housing member 8 and fastener guide 10 are flush with each other and in engagement with the surface 154. As the fastener guide 10 moves rearwardly, the flange portion 110 contacts the forward end portion of the sensing member 70 and moves that member rearwardly relative to the barrel member 4. Rearward movement of the sensing member 70 moves the firing mechanism 22 rearward in the rear portion 18 of the housing 2 due to the engagement of the sensing member 70 with the cocking member 42. When the end faces 156 and 158 are flush with each other, the firing mechanism 22 is moved into the position shown in FIG. 6 wherein the detent 38 on the firing pin 28 is aligned with sear portion 52 of the trigger member 50. At this point the tool is in proper position for firing by pressing the trigger member 50 which will release the detent 38 from the cocking member 42. The firing pin will then be projected forwardly by virtue of its associated spring member 46 whereupon the conical nose portion 32 will be extended through the frusto-conical opening 40 in the breech closure portion 20 of the housing 2 striking the cartridge 152. The release of the gases by the actuation of the cartridge 152 will project the piston member 6 forwardly within the barrel member 4 a sufficient distance to drive the fastener member 142 into the surface 154.

After the firing operation is completed, the operator may again grasp the buffer housing member 8 and pull the buffer housing member 8 forward relative to the housing 2 to move the components of the tool into their breech open position. In so doing, the barrel member 4 will move forward relative to the housing guided by the barrel guide screw 78 in the relatively short axially extending portion 82 of the Z-slot 80. The relative movement may continue until the barrel guide screw 78 is aligned with the circumferentially extending portion 86 of the Z-slot 80 whereupon the buffer housing 8 may be rotated by the operation to align the barrel member 4 with the relatively long axially extending portion 84 of the Z-slot 80.

Since the barrel guide screw 78 extends into the bore 58 of the barrel member 4, the forward end of the head portion 88 of the piston member 6 will abut the barrel guide screw 78 during the forward movement of the barrel member 4 with respect to the housing 2, whereby the piston member 6 will be held stationary with respect to the housing 2 while the barrel member 4 is drawn forward relative thereto. The forward movement of the barrel member 4 relative to the housing 2 is arrested by the abutment of the piston member 6 against the end of the bore 58 in the barrel member 4.

As the barrel member 4 is drawn forward relative to the housing 2, the extractor mechanism 122 is actuated by abutment against the barrel guide screw 78. Referring particularly to FIGS. 8 and 9, as the barrel member 4 is moved toward the breech open position, the end of the rod portion 130 of the extractor mechanism 122 abuts the barrel guide screw 78 whereupon the cartridge receiving chamber 62 continues in its forward movement. The lip portion 128 of the extractor mechanism 122 engages the head of the cartridge and, along with the air pressure built up in the barrel member 4 behind the head portion 88 of the piston member 6, serves to extract the spent cartridge from the cartridge receiving chamber 62. At this point, the breech portion of the barrel member 4 is exposed through the opening 16 in the housing member 2 and a new cartridge may be inserted in the cartridge receiving chamber 62. A new fastener member may be inserted in the fastener guide 10 and the firing operation repeated.

By virtue of the above-described structural arrangements of the various components of the tool, air firing of the tool is rendered substantially impossible. For example, if the operator grasps the buffer housing member 8 without positioning the tool against a suitable surface and moves it rearwardly toward the housing 2 into the position shown in FIG. 5, the tool could not be fired since the detent member 38 in the firing pin 28 has not been moved rearwardly into a position to be engaged by the sear portion 52 of the trigger member 50.

Figure 6:
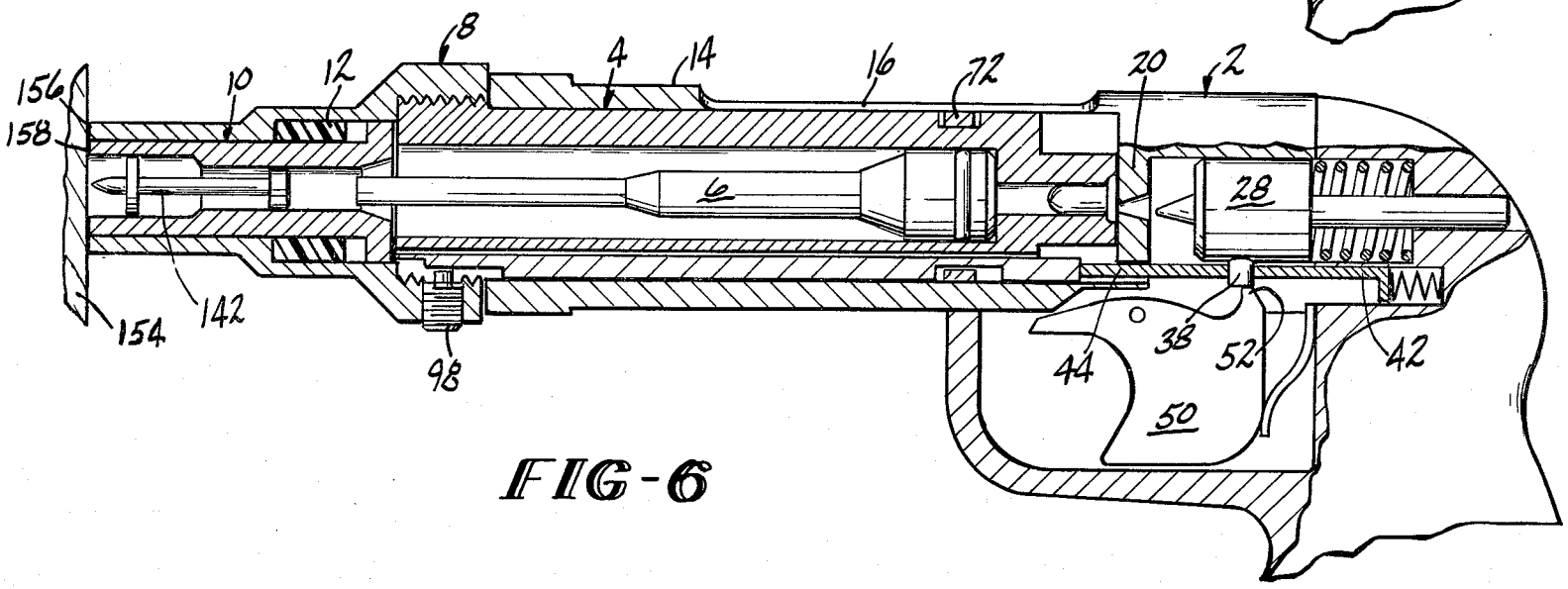
FIG. 6 is a longitudinal sectional view of a tool in another stage of the operation wherein the tool is properly positioned against a suitable surface and ready for firing.

As yet another feature of this invention, if after the tool is properly positioned against a suitable surface such as shown in FIG. 6, the tool is tilted a sufficient distance from the position wherein its axis is perpendicular to the work surface, the tool cannot be fired. As the tool is tilted from its position as shown in FIG. 6, the fastener guide 10 moves forward relative to the buffer housing member 8 until it also contacts the work surface. This forward movement is accomplished by virtue of the sensing member 70, which has its forward end in contact with the fastener guide 10, being biased forwardly by the cocking member 42 which is under the action of the spring members 36 and 46. At this point the firing mechanism 22 will have moved forwardly in the housing 2 to a position wherein the detent 38 is out of alignment with the sear portion 52 of the trigger member 50.

In the event that the piston member 6 is overdriven due to the fact that the fastener member 142 penetrated the work surface too deeply, or went through the work surface, the tapered portion 92 on the shank portion 90 of the piston member 6 will engage the correspondingly tapered portion 116 of the fastener guide 10. The energy of the piston member 6 will then be transmitted through the fastener guide 10 and be absorbed by the buffer member 12.

While reference has been made above to a preferred embodiment of the invention it will be appreciated that various modifications and alterations will readily suggest themselves to those skilled in the art. Accordingly, the scope of this invention should be ascertained by reference to the following claims:

What is claimed is:

1. A power-actuated tool including a receiver having a front and rear portion, barrel means slidably mounted within said front portion for movement between a breech open position and a breech closed position, said barrel means including a breech end and a muzzle end, firing pin means mounted in said rear portion for movement between a cocked position and a fired position, cocking means operably connected to said firing pin means to move said firing pin means from its fired position to its cocked position, sleeve means attached to the muzzle end of said barrel means, guide means mounted within said sleeve means for relative axial movement therewith, and sensing means mounted in said barrel means for relative movement therewith, said sensing means being in engagement with said cocking means and with said guide means when said barrel means is in its breech closed position with said guide means extending from the muzzle end of said sleeve means, whereby said guide means must be moved toward said rear portion of said [housing] *receiver* with respect to said sleeve means to move said firing pin means to its cocked position.

2. The power-actuated tool of claim 1 wherein said front and rear portions of said receiver are separated by breech closure member, said cocking means extends into said forward portion *of said receiver*, said sensing means comprises an elongated rod member mounted within an axially extending groove in the outer surface of said barrel [member] *means*, and said barrel [member] *means* includes a circumferentially extending groove on its outer surface, and further including a band spring mounted within said groove, said sensing means having a cutout portion for reception of said band spring, the length of said cutout portion being greater than the width of said spring to permit movement of said sensing means with respect to said barrel means.

3. The power-actuated tool of claim 1 wherein said sleeve [member] *means* comprises a buffer housing member having a counterbore therein, said counterbore having a larger diameter than the bore of said barrel means and wherein said guide means has an upstanding flange adjacent its rearward end having a diameter substantially equal to the diameter of said counterbore, and further comprising a buffer member disposed between said counterbore and said flange [member], said buffer member having an axial length less than the depth of the counterbore minus the thickness of said flange whereby axial movement of said [fastener] guide *means* relative to said buffer [housing] *member* is permitted.

4. The power-actuated tool of claim 3 further including piston means mounted within said barrel means for movement from a firing position to a driven position, said guide means including a tapered portion, and said piston means including a correspondingly tapered portion adapted to engage said tapered portion on said guide means when said piston *means* is in its driven position whereby the energy of said piston is transferred to said buffer member if said piston is driven beyond said driven position.

5. A power-actuated tool including a receiver having a front and rear portion separated by a breech closure portion, a barrel member slidably mounted within said front portion for movement between a breech open and breech closed position, said barrel member having a breech end and muzzle end, firing pin means mounted within said rear portion for movement between a fired [positions] *position* and a cocked position, cocking means operably connected to said firing pin means to move said firing means from its fired position to its cocked position, said cocking means extending into said [forward] *front* portion of said receiver, buffer housing means secured to the muzzle end of said barrel [means] *member*, said buffer housing *means* having an enlarged counterbore opening into said barrel means, said counterbore having a greater diameter than the bore of said barrel [means] *member*, guide means mounted within said buffer housing *means* for relative axial movement therewith, said guide means having an outwardly extending flange portion adjacent its rearward end, said flange portion having a diameter substantially equal to the diameter of said counterbore, buffer means mounted within said counterbore and positioned between said buffer housing *means* and said flange [position] *portion* of said guide means, said buffer [member] *means* having an axial length less than the difference between the length of the counterbore and width of said flange portion whereby axial movement of said guide means relative to said buffer housing *means* is permitted, sensing rod means mounted in a groove in the outer surface of said barrel [means] *member* and extending the entire length thereof, a band spring surrounding said barrel member and mounted in a groove therein, said sensing rod means having a cutout portion for reception of said band spring, said cutout portion having a greater axial length than the width of said band spring whereby limited relative axial movement of said sensing rod means with said barrel member is permitted, said sensing means engaging said cocking means and in contact with said guide means when said barrel [means] *member* is in its breech closed position with said guide means extending from the muzzle end of said buffer housing *means* whereby said guide means must be moved rearwardly with respect to said buffer housing *means* until their end faces are substantially flush with each other to move said sensing means and cocking means rearwardly with respect to said barrel member and said receiver to thereby move said firing pin means from its fired position to its cocked position.

[6. A power-actuated tool including a receiver having a tubular forward portion, a barrel member mounted within said forward portion for relative movement therewith, said barrel member having cartridge chamber in one end thereof, a barrel guide slot extending axially in said barrel member, means secured to the forward portion of said receiver and extending into said barrel guide slot, and extractor means mounted on said barrel member and having a lip portion communicating with said cartridge chamber and adapted to engage a cartridge positioned in said cartridge chamber, said extractor means being mounted for relative axial movement with respect to said barrel member and having a portion extending into said barrel guide slot whereby during movement of said barrel member with respect to said receiver member said means extending into said barrel guide slot will engage said portion of said extractor to actuate said extractor.]

[7. The power-actuated tool of claim 6 further including a bore in said barrel member, a piston member having a head portion and a shank portion mounted within said bore, and wherein said barrel guide slot communicates with said bore and said means secured to said receiver extends into said bore in a position to engage the head portion of said piston member.]

8. The power-actuated tool of claim [6] *11* wherein said extractor means includes a rod portion extending through an opening in said barrel member and into said barrel guide slot and said barrel member includes a cutout portion communicating with said cartridge chamber for reception of said extractor *means*.

9. The power-actuated tool of claim 8 further including a groove in the outer surface of said barrel member having a portion communicating with said opening, and a band spring positioned in said groove and extending about said barrel member with an end portion extending into said portion communicating with said opening, said rod portion of said extractor *means* having a cutout portion for reception of said band spring, said cutout portion having a length greater than the width of said band spring whereby limited relative movement of said extractor *means* with said barrel member is permitted.

10. A power-actuated tool including a receiver having a tubular forward portion, a barrel member mounted within said forward portion for relative movement therewith, said barrel member having a bore in one end thereof and a cartridge chamber in the opposite end thereof communicating with said bore, a barrel guide slot extending axially in said barrel member and communicating with said bore, screw means secured to the forward portion of said receiver and extending through said barrel guide slot into said bore, piston means mounted within said bore, said piston means having a head portion and a reduced shank portion, an extractor mounted on said opposite end of said barrel member, said extractor including a head portion received within a slot in said barrel member, said head portion including a lip communicating with said cartridge chamber and adapted to engage a cartridge positioned in said cartridge chamber, a rod portion on said extractor extending through an opening in said barrel [means] *member* and into said barrel guide slot, a circumferential groove in the outer surface of said barrel member having a portion communicating with said opening, and a band spring positioned in said groove and extending about said barrel member with an end portion extending into said portion of said groove communicating with said opening, said rod portion of said extractor having a cutout portion for reception of said band spring, said cutout portion having a length greater than the width of said band spring whereby limited relative movement of said extractor with said barrel member is permitted, said means on said receiver extending into said bore being positioned to engage the head portion of said piston member and said rod portion of said extractor upon movement of said barrel member relative to said receiver.

*11. A power-actuated tool including a receiver having a tubular forward portion, a barrel member mounted within said forward portion for relative movement therewith, said barrel member having a cartridge chamber in one end thereof and a bore, a piston member having a head portion and a shank portion mounted within said bore, a barrel guide slot extending axially in said barrel member and communicating with said bore, means secured to the forward portion of said receiver and extending into said barrel member through said barrel guide slot and into said bore in a position to engage the head portion of said piston member, and extractor means mounted on said barrel member and having a lip portion communicating with said cartridge chamber and adapted to engage a cartridge positioned in said cartridge chamber, said extractor means being mounted for relative axial movement with respect to said barrel member and having a portion extending into said barrel guide slot whereby, during movement of said barrel member with respect to said receiver, said means extending into said barrel guide slot will engage said portion of said extractor means to actuate said extractor means.*

*12. A power-actuated tool comprising:*

*(a) a receiver;*

*(b) a barrel member mounted in said receiver for relative axial movement therewith;*

*(c) a piston member mounted in a bore within said barrel member for movement therein between a driving position and a driven position;*

*(d) means forming a cartridge chamber in a breech end of said barrel member;*

*(e) means forming an axially extending guide slot in said barrel member, said guide slot opening into said barrel bore;*

*(f) guide means secured to said receiver and extending through said guide slot and into said barrel bore, said guide means being operable to engage said piston member to move the latter from said driven position to said driving position responsive to axial movement between said barrel member and said receiver;*

*(g) said barrel member having a slot communicating with said cartridge chamber;*

*(h) means forming an opening extending through said barrel member between said last named slot and said barrel guide slot;*

*(i) extractor means moveably mounted in said barrel member slot, said extractor means including a lip portion adapted to engage the head of a cartridge chambered in said cartridge chamber, and said extractor means including a portion thereof extending through said opening into said barrel guide slot;*

*(j) means forming a recess extending circumferentially about said barrel member;*

*(k) a spring means mounted in said recess and operable to limit the extent of movement of said extractor means; and*

*(l) said guide means being operable to engage said portion of said extractor means extending into said barrel guide slot, when returning said piston member to said driving position, to actuate said extractor means.*

* * * * *